US012720315B2

(12) United States Patent
Vemuri

(10) Patent No.: US 12,720,315 B2
(45) Date of Patent: Aug. 25, 2026

(54) SYSTEM AND METHOD FOR FACILITATING MOBILE DEVICE ACCESS TO WEB APPLICATIONS

(71) Applicant: Verizon Patent and Licensing Inc., Basking Ridge, NJ (US)

(72) Inventor: Bharadwaj Vemuri, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 366 days.

(21) Appl. No.: 18/182,801

(22) Filed: Mar. 13, 2023

(65) Prior Publication Data

US 2024/0314568 A1 Sep. 19, 2024

(51) Int. Cl.

| | |
|---|---|
| ***H04M 1/72469*** | (2021.01) |
| ***G06F 3/04817*** | (2022.01) |
| ***G06F 9/451*** | (2018.01) |
| ***H04W 12/06*** | (2021.01) |
| ***H04W 12/30*** | (2021.01) |
| ***H04W 40/02*** | (2009.01) |
| ***H04W 48/18*** | (2009.01) |

(52) U.S. Cl.

CPC ........ *H04W 12/35* (2021.01); *G06F 3/04817* (2013.01); *G06F 9/451* (2018.02); *H04M 1/72469* (2021.01); *H04W 12/06* (2013.01); *H04W 40/02* (2013.01); *H04W 48/18* (2013.01)

(58) Field of Classification Search

CPC ..... H04W 12/03; H04W 12/06; H04W 40/02; H04W 48/18; G06F 9/451; G06F 3/04817; H04M 1/7246

USPC .......................................................... 455/411

See application file for complete search history.

(56) References Cited

U.S. PATENT DOCUMENTS

| | | | | |
|---|---|---|---|---|
| 10,353,686 | B1 * | 7/2019 | Pasha | H04L 67/34 |
| 10,404,698 | B1 * | 9/2019 | Natarajan | H04L 67/535 |
| 2013/0111407 | A1 * | 5/2013 | Mullen | G06F 8/61 715/834 |
| 2014/0047517 | A1 * | 2/2014 | Ding | H04L 12/1453 726/5 |
| 2015/0207800 | A1 * | 7/2015 | Jitkoff | H04W 12/37 726/8 |
| 2019/0116256 | A1 * | 4/2019 | Rahman | H04W 4/02 |
| 2019/0370448 | A1 * | 12/2019 | Devine | G06V 40/166 |
| 2020/0092332 | A1 * | 3/2020 | Bhattathiri | H04L 63/20 |
| 2021/0392491 | A1 * | 12/2021 | Chen | H04W 8/183 |
| 2021/0400572 | A1 * | 12/2021 | Caceres | H04W 12/069 |
| 2022/0311569 | A1 * | 9/2022 | Zhang | H04L 41/0895 |
| 2023/0396695 | A1 * | 12/2023 | Brown | G06F 8/61 |
| 2024/0236063 | A1 * | 7/2024 | Chen | G06F 9/547 |

* cited by examiner

*Primary Examiner* — Wesley L Kim

(57) ABSTRACT

A system comprises a User Equipment device (UE) that includes a processor. The processor may be configured to instantiate a bridge application that includes a container application, wherein the bridge application runs on a container platform on the UE. The bridge application may be configured to: receive application information from a map system on a network slice; display the application information as one or more icons that represent web applications on one or more networks; and when an icon is activated, access a web application among the web applications, wherein the web application corresponds to the icon.

20 Claims, 7 Drawing Sheets

ENVIRONMENT
100
UE
102
BRIDGE
APPLICATION
108
NETWORK 104
MAP
SYSTEM
110
CONTENT
114
PORTAL
116
APP
112
PARTNER
DEVICE
106

200
ACCESS NETWORK 204
ACCESS STATION 210
UE 102
MD 214
108
PARTNER DEVICE 106
CORE NETWORK 206
NETWORK SLICE 212
MAP SYSTEM 110
DATA NETWORK 208-1
APP 112
CONTENT 114
DATA NETWORK 208-2
PORTAL 116

MAP SYSTEM 110
INTERFACE 302
ENDPOINT DB 304

MD SYSTEM 214
BRIDGE APP 108
WEB KIT 402
SECURITY 404
BIO-IF 406
PERSISTENCE MANAGER 408
CONTAINER PLATFORM 410
BIOMETRICS DRIVERS 412
OPERATING SYSTEM 414
MODEM 416
URSP DB 418

FIG. 5

CORE NETWORK 206

AMF 502

SMF 504

UPF 506

UDM 508

PCF 510

NEF 512

AUSF 514

600
RECEIVE URSP RULES; STORE URSP RULES
602
UPLOAD APPLICATION/ CONTENT
604
UPLOAD APP INFO; STORE APP INFO
606
START BRIDGE APP; GET USER CREDENTIALS
608
ATTEMPT TO CONNECT
610
APPLY URSP RULES
612
AUTHENTICATE; CONNECT
614
GET APPLICATION INFORMATION
616
ACCESS APPLICATION/ CONTENT
618

SYSTEM AND METHOD FOR FACILITATING MOBILE DEVICE ACCESS TO WEB APPLICATIONS

BACKGROUND INFORMATION

Virtual machines may include hardware, a hypervisor that emulates abstracted versions of hardware, and an operating system. Thus, for virtual machines, hardware is virtualized. In contrast, a container is a program that is run in a container engine, which in turns runs on an operating system. For containers, the operating system is virtualized.

In many situations, deploying applications as containers offer advantages over deploying the applications directly on their native operating systems. For example, deploying two applications that run on different operating systems may require installation of both operating systems. In contrast, a container does not need a copy of its own operating system to run. Due to their flexibility, they can be installed and run on a variety of operating systems and host devices.

BRIEF DESCRIPTION OF THE DRAWINGS

FIG. 5 shows exemplary components of a core network, according to an implementation;

DETAILED DESCRIPTION OF EXAMPLE EMBODIMENTS

The following detailed description refers to the accompanying drawings. The same reference numbers in different drawings may identify the same or similar elements. As used herein, the terms "service provider" and "provider network" may refer to, respectively, a provider of communication services and a network operated by the service provider. The term "partner" may refer to an entity different from a service provider. A partner may access a provider network operated by the service provider under a business agreement or a contract.

Systems and methods described herein relate to facilitating mobile device access to web applications. Many service providers operate advanced networks (e.g., cellular networks) that offer broadband connections to mobile devices (e.g., smart phones). Given a typical network infrastructure that a service provider manages, the service provider may be in a position to help another party (e.g., a partner) that develops applications to have a greater exposure to the users of mobile devices. The systems and methods described herein permit a partner to upload information pertaining to their applications to the provider network and facilitate the user device access to the applications.

Figure 1:
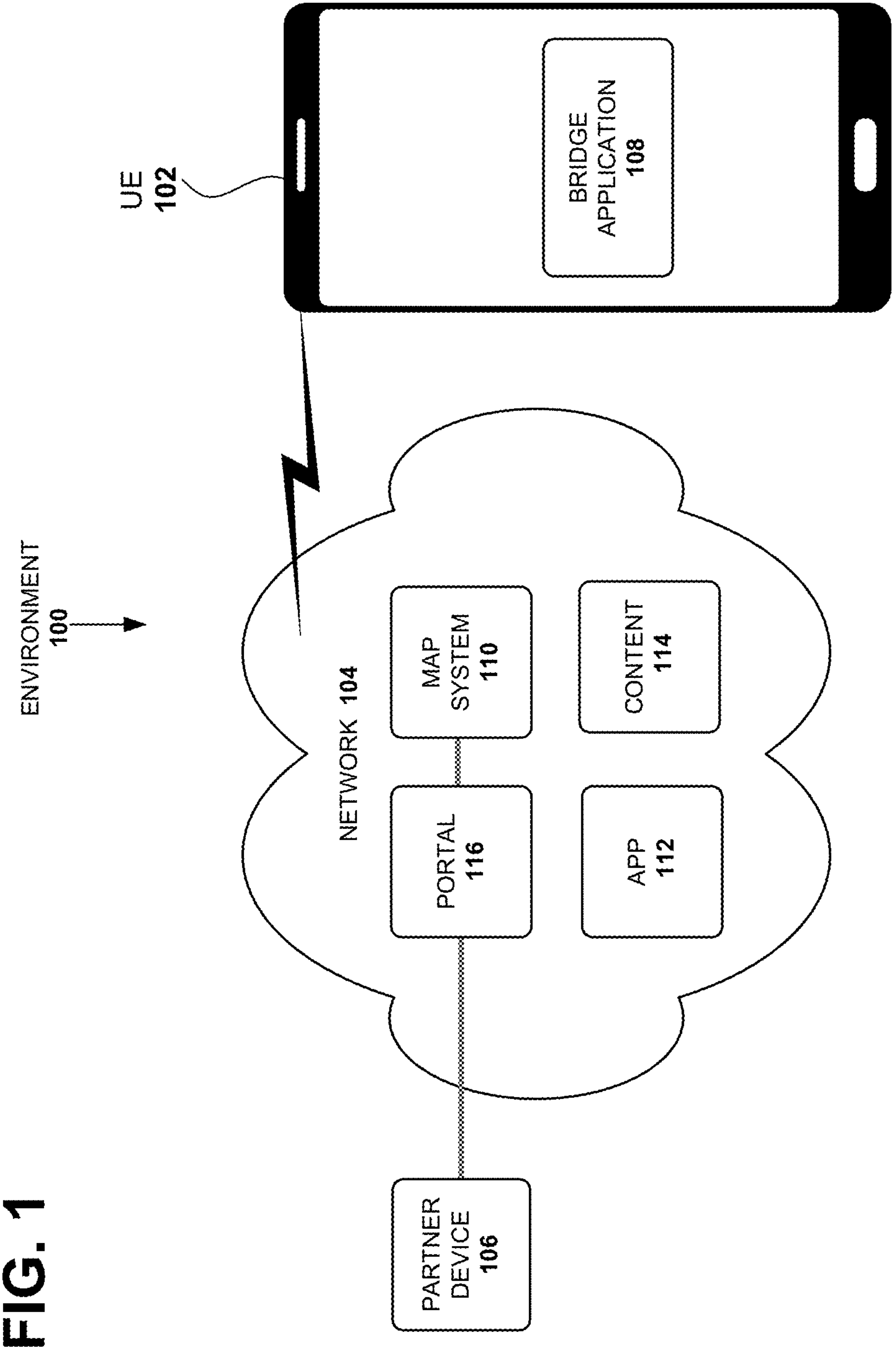
FIG. 1 illustrates concepts described herein.

FIG. 1 illustrates the concept. As shown, an environment 100 includes a User Equipment device (UE) 102, a network 104, and a partner device 106. UE 102 comprises a bridge application 108, which, when launched, obtains a list of applications or contents (e.g., a list of Universal Resource Locators (URLs) or Universal Resource Identifiers (URIs)) and displays the list as icons on the screen. Network 104 comprises a provider network (not shown) that includes a map system 110. Map system 110 stores a list of applications and/or contents in the form of URLs, URIs and/or another form of expression. The stored list of applications and/or contents, along with other information pertaining to the applications and/or the contents, may be collectively referred to as application information. Periodically or on demand, map system 110 may provide the latest application information to bridge application 108.

After a partner completes the development of application 112 and/or content 114, the partner may install application 112 and/or store content 114 on a portion of network 104 (e.g., a cloud). To permit the user of UE 102 to notice and/or access application 112 and/or content 114, the partner may use a partner device 106 to upload the application information to map system 110 in the provider network via portal 116. When the user of UE 102 accesses bridge application 108, bridge application 108 may obtain the application information from map system 110 and display the application information as icons. When the user may activate the icon corresponding to application 112 or content 114, in response, bridge application 108 may access and/or receive services from application 112 and/or obtain content 114. UE 102, network 104, partner device 106, bridge application 108, map system 110, application 112, content 114, and portal 116 are described below in greater detail with reference to FIGS. 2-5.

Figure 2:
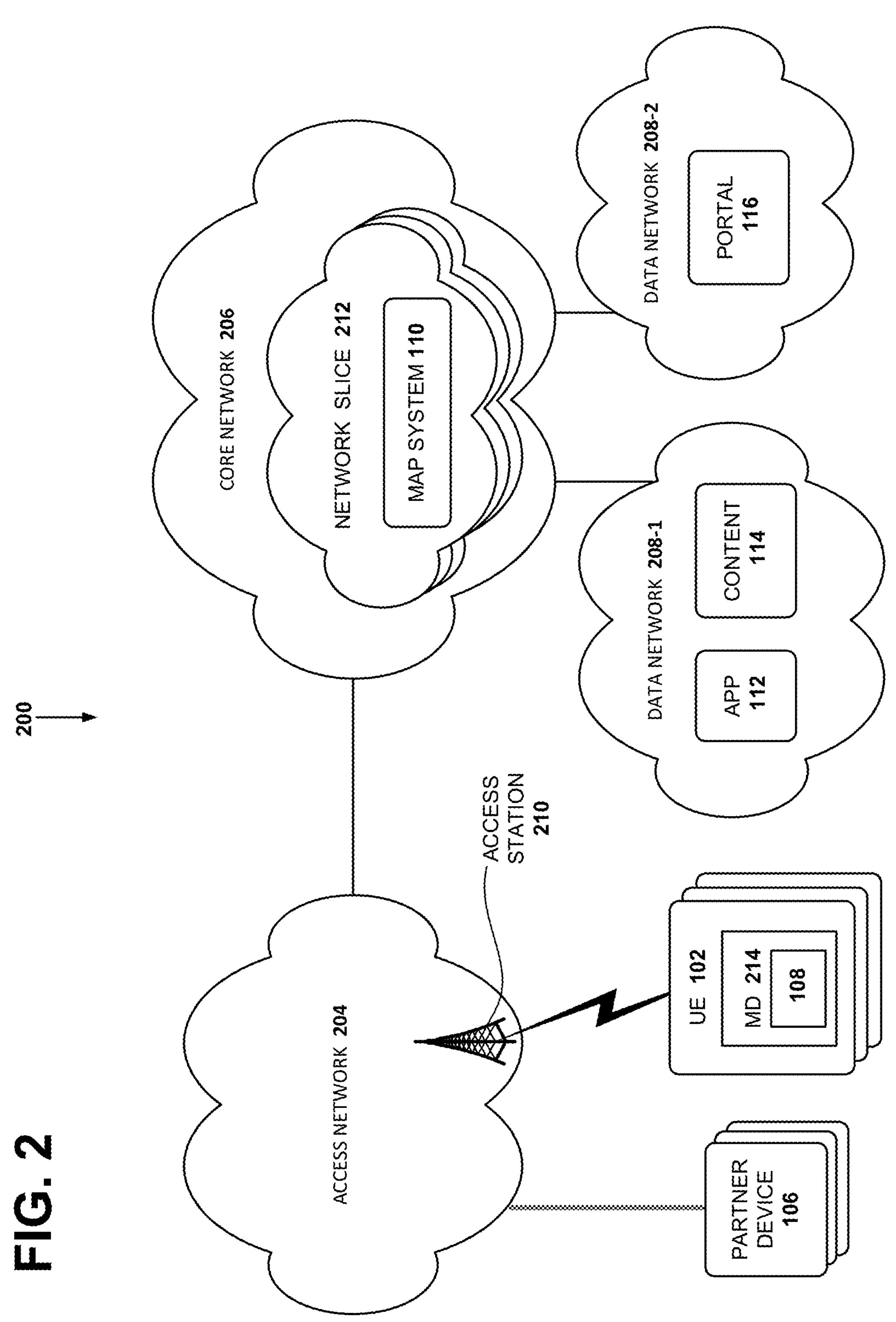
FIG. 2 illustrates an exemplary network in which systems and methods described herein may be implemented.

FIG. 2 illustrates an exemplary network environment 200 in which the systems and methods may be implemented. As shown, environment 200 may include one or more of UE 102, one or more of partner device 106, an access network 204, a core network 206, and data networks 208-1 and 208-2 (collectively referred to as data networks 208 and generically as data network 208). Access network 204, core network 206, and/or data networks 208 may be part of network 104.

UE 102 may include wireless communication devices capable of cellular communication, such as Fourth Generation (4G) (e.g., Long-Term Evolution (LTE)) communication and/or Fifth Generation (5G) New Radio (NR) communication. Examples of UE 102 include: a smart phone; a tablet computer; a Fixed Wireless Access (FWA) device; a wearable computer device (e.g., a smart watch); a global positioning system (GPS) device; a laptop computer; a media playing device; a portable gaming system; an autonomous vehicle navigation system; a sensor, such as a pressure sensor or; and an Internet-of-Things (IOT) device with Wi-Fi® capabilities. In some implementations, UE 102 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices. A user of UE 102 may launch bridge application 108 to view available links to applications (e.g., application 112) and/or content (e.g., content 114) and, using the links, may cause bridge application 108 receive services from application 112 and/or receive content 114.

Partner device 106 may include a wireless or wireline communication device. In some implementations, partner device 106 may include a type of UE 102. Partner device 106 may include a client application (e.g., a browser) through which the partner can upload application 112 or content 114 to network 208-1 or can relay, via portal 116, application information to map system 110. The application information may include: URLs and/or URIs; a document (e.g., an Extensible Markup Language (XML) document, a Hypertext Transfer Protocol (HTTP) document, a Yet another Markup Language (YAML) document, etc.) pertaining to an application or content; a logo, an image, or an icon associated with the application; etc. In some implementations, application information may also include an application type (e.g., a free application, a secure application, a premium application, etc.).

Access network 204 may allow UE 102 to access core network 206. To do so, access network 204 may establish and maintain, with participation from UE 102, an over-the-air channel with UEs 102; and maintain backhaul channels with core network 206. Access network 204 may relay information through such channels, from UE 102 to core network 206 and vice versa. Access network 204 may include an LTE radio network and/or a 5G NR network, or another advanced radio network. These networks may include many central units (CUs), distributed units (DUs), radio units (RUs), and wireless stations, one of which is illustrated in FIG. 2 as access station 210 for establishing and maintaining over-the-air channel with UE 102. Access station 210 may include a 4G, 5G, or another type of base station (e.g., eNB, gNB, etc.) that comprises one or more RF transceivers. In some implementations, access station 210 may be part of an evolved Universal Mobile Telecommunications Service (UMTS) Terrestrial Network (eUTRAN).

Core network 206 may manage communication sessions of users (also referred to as subscribers) connecting to core network 206 via access network 204. For example, core network 206 may establish an Internet Protocol (IP) connection between UEs 102 and data networks 208. In some implementations, core network 206 may include a 5G core network. In other implementations, core network 206 may include a 4G core network (e.g., an evolved packet core (EPC) network) or another type of core network.

The components of core network 206 may be implemented as dedicated hardware components or as virtualized functions implemented on top of a common shared physical infrastructure using Software Defined Networking (SDN). For example, an SDN controller may implement one or more of the components of core network 206 using an adapter implementing a Virtual Network Function (VNF) virtual machine, a container, an event driven server-less architecture interface, and/or another type of SDN component. The common shared physical infrastructure may be implemented using one or more devices 800 described below with reference to FIG. 8. Exemplary components of core network 206 are described below with reference to FIG. 5.

As shown, core network 206 may include one or more network slices 212. Depending on the implementation, network slices 212 may be implemented within other networks, such as access network 204 and/or data network 208. Access network 204, core network 206, and data network 208 may include multiple instances of network slices 212. Each network slice 212 may be instantiated as a result of "network slicing," which involves a form of virtual network architecture that enables multiple logical networks to be implemented on top of a shared physical network infrastructure using the SDN and/or network function virtualization (NFV). Each logical network, referred to as a "network slice," may encompass an end-to-end virtual network with dedicated storage and/or computational resources that include access network components, clouds, transport networks, Central Processing Unit (CPU) cycles, memory, etc. Furthermore, each network slice 212 may be configured to meet a different set of requirements and may be associated with a particular Quality of Service (QOS) class, a type of service, 5G QoS Identifier (5QI), and/or a particular group of enterprise customers associated with communication devices.

Each network slice 212 may be associated with an identifier, herein referred to as a Single Network Slice Selection Assistance Information (S-NSSAI) and/or a network slice instance ID. Each UE 102 that is configured to access a particular network slice may be associated with corresponding subscription data, stored in core network 206 for example, that includes the S-NSSAI corresponding to the network slice.

Data networks 208-1 and 208-2 each may include one or more networks connected to core network 206. In some implementations, a particular data network 208 may be associated with a data network name (DNN) in 5G and/or an Access Point Name (APN) in 4G. UE 102 may request a connection to data network 208 using a DNN or APN. Each data network 208 may include, and/or be connected to and enable communication with a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also simply referred to as application). An application may provide services for a program or an application running on UEs 102 and may establish communication sessions with UEs 102 via core network 206.

In FIG. 2, UE 102, core network 206 and data networks 208 may include network components of the system for facilitating UEs 102 access to application 112 and/or content 114. The system may include: a Mobile Device (MD) subsystem 214, map system 110, application 112, content 114, a portal 116, and/or core network functions (NFs). Although UE 102, core network 206 and data networks 208-1 and 208-2 may include other components of the system, for clarity, they are not illustrated.

MD subsystem 214 may include bridge application 108 and other components needed to support the functions of bridge application 108. MD subsystem 214 and bridge application 108 are described below in greater detail with reference to FIG. 4. Map system 110 may be hosted by the provider network. Although map system 110 is shown as being included hosted on network slice 212, in other embodiments, map system 110 may be hosted on another part of the provider network, such as a data center in core network 206, data network 208 that is operated by the service provider, edge devices in access network 204, etc. As already indicated above, map system 110 may receive application information (e.g., a URL/URI for application 112) from partner devices 106 via portal 116 or other network components, store the information, and convey the information to bridge application 108 on UE 102.

Application 112 and content 114 may include an application instance and a content (e.g., web pages) that the partner may have installed or stored on network 208-1. Depending on the implementation, network 208-1, which is shown as including application 112 and content 114, may or may not belong to the service provider. Application 112 and content 114 may not be stored and/or installed on the same network, although both application 112 and content 114 are illustrated as being included in data network 208-1.

Portal 116 may include a gateway to different networks. For example, partner device 106 may access the provider network via portal 116. By permitting those outside the provider network to access the provider network though portal 116, the service provider may protect the provider network from various security threats. In one implementation, portal 116 may receive application information from partner device 106 and relay the information to map system 110. In some implementations, portal 116 may convey the application information to map system 110 through a particular network component, referred to as a network exposure function (NEF). An NEF may act as an intermediary between devices outside the provider network and components within the provider network.

For clarity, FIG. 2 does not show all components that may be included in network environment 200 (e.g., routers; bridges; wireless access points; additional networks; additional UEs 102, partner devices 106, access stations 210, applications 112, contents 114, and/or portals; etc.). Depending on the implementation, network environment 200 may include additional, fewer, different, or a different arrangement of components than those illustrated in FIG. 2. Furthermore, in different implementations, the configuration of network environment 200 may be different.

Figures 3, 4:
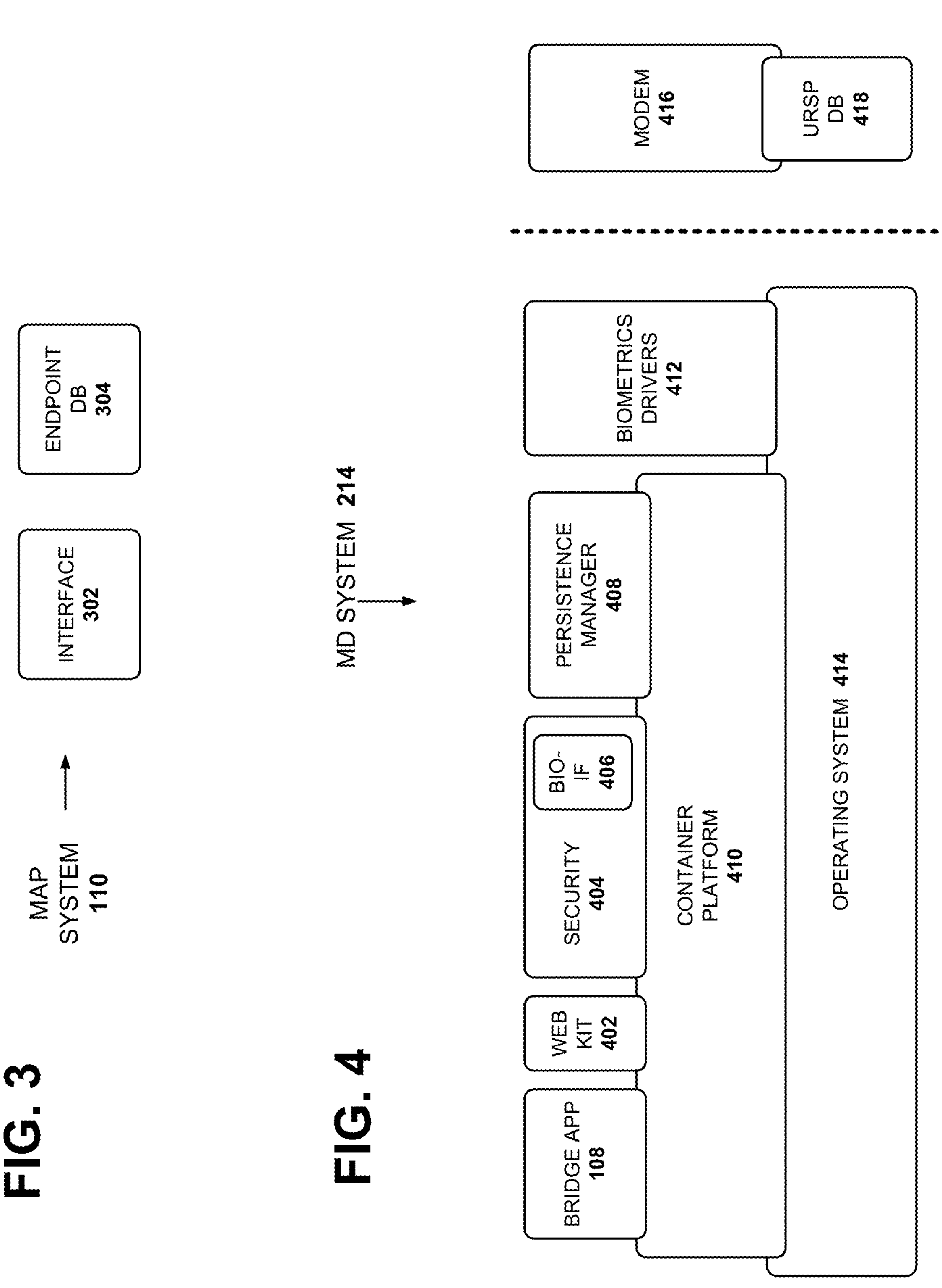
FIG. 3 depicts an exemplary map system according to an implementation.
FIG. 4 shows exemplary functional components of a Mobile Device (MD) system on a User Equipment device (UE), according to an implementation.

FIG. 3 depicts an exemplary map system 110 according to an implementation. As shown, map system 110 may include an interface 302 and an endpoint database 304. Depending on the implementation, map system 110 may include additional or different components than those illustrated in FIG. 3, such as, for example, a security module, a local database of subscribed users, a whitelist of mobile devices, and/or a blacklist of mobile devices.

Interface 302 may receive application information from either an NEF within core network 206 (e.g., when portal 116 conveys application information through the NEF) or from partner device 106. As noted above, the application information may include: application location information and other information about the application (e.g., a URL, URI, XML document, YAML document, an HTML document, JavaScript Object Notation (JSON) data, etc.); and an icon, an image, and/or a logo corresponding to each of the applications described by the application information. The application location information may include the network link through which a UE can access the application or the content. Interface 302 may store the received application information in endpoint database 304.

In addition to receiving application information, interface 302 may also provide application information in endpoint database 304 to bridge applications in UEs 102, as a user app list. In some implementations, when interface 302 receives a request for a user app list from UE 102, interface 302 may contact a Unified Data Management (UDM) to obtain subscription information associated with the user of UE 102 from the UDM. Based on the subscription information from the UDM and application information from endpoint database 304, interface 302 may generate a user app list and forward the user app list to UE 102. Depending on the context, the term "application information" may not refer to the application information stored in endpoint database 304 but to the user app list generated based on the application information.

When generating a user app list, interface 302 may determine, for each application identified in endpoint database 304, what information to include in the app list based on the subscription information and the application type specified in the application information. For example, if the application information indicates that the application is a GOLD type and the user of UE 102 is a premium subscriber (determined based on the subscription information), interface 302 may include the application information as part of the user app list. In contrast, if the user is a non-premium subscriber, interface 302 may either exclude a portion of the information from the user app list or modify the application information before including the information in the user app list. The modified information may indicate, for instance, that the user may need to upgrade his or her subscription to access the application or that the user has a limited trial period for using the application. In another example, if the application information indicates that the application type is FREE, interface 302 may include the application information in the user app list regardless of the level of user scription.

FIG. 4 shows exemplary functional components of a Mobile Device (MD) system 214 on UE 102 according to an implementation. As shown, MD system 214 may include bridge application 108, a web kit 402, a security module 404, a biometrics interface (BIO-IF) 406, a persistence manager 408, a container platform 410, biometrics drivers 412, an operating system 414, a modem 416, and a UE Route Selection Policy (URSP) rules database 418. Depending on the implementation, MD system 214 may include additional, fewer, different, or a different arrangement of components than those illustrated in FIG. 4.

Bridge application 108 may include a containerized application (e.g., an application that runs on Docker®). Bridge application 108 may receive a user app list from map system 110 and display the user app list on the display screen of UE 102. In one embodiment, each of the applications represented by the user app list may be displayed as an icon or an image, etc. (herein simply referred to as an icon). For example, assume that an icon represents a link to application 112 or content 114 on data network 208-1. When the user of UE 102 activates the icon, bridge application 108 may access application 112 or content 114 and interact with application 112 or content 114, in a manner similar to that of a browser.

In some implementations, bridge application 108 may perform a security check on the user of UE 102 when bridge application 108 starts or when the user activates an icon corresponding to application 112, via Application Programming Interface (API) calls to security module 404. Additionally, bridge application 108 may persist the application information on a local storage by writing to a drive either on which persistence manager 408 has mounted a physical volume or to a database provided by persistence manager 408.

Web kit 402 may enable bridge application 108 to execute JavaScript natively and locally. In some implementations, each piece of application information in the user app list that bridge application 108 receives from map system 110 may include JavaScript code that a partner uploaded to map system 110. When the user of UE 102 activates the icon corresponding to application 112, bridge application 108 may invoke web kit 402 to handle the JavaScript code for application 112. By executing the JavaScript code, web kit 402 may perform any callbacks to application 112. Each piece of JavaScript code may be application specific. Without web kit 402, the JavaScript code would be executed by web-server functionalities at application 112 side.

Security module 404 may permit bridge application 108 to perform security checks on users of UE 102. Depending on the implementation, bridge application 108 may be configured to perform a security check on the user of UE 102 when the user activates bridge application 108 or when the user attempts to access application 112 by activating the icon, corresponding to application 112, on the display screen. After the launch or the activation of the icon, bridge application 108 may call the methods of security module 404. In turn, security module 404 may initiate a procedure for authenticating the user. For example, security module 404 may present input boxes for the user to provide credentials (e.g., a user identifier (ID) and a password). In another implementation, security module 404 may call biometrics interface 406 to capture biometrics information associated with the user (e.g., fingerprint, an image of the user, etc.) and return a set of user credentials corresponding to the captured biometrics information. Security module 404 may then either verify the authority of the user with the provider network or cause bridge application 108 to verify the authority of the user with the provider network.

Biometrics interface 406 may receive requests for user credentials from different container programs on container platform 410 and call biometrics drivers 412 via container platform 410 and operating system 414 to obtain biometrics information. When biometrics drivers 412 obtain the biometrics information from the user (e.g., via touch screen, camera, etc.), biometrics interface 406 may look up, using the obtained biometrics information, a database of stored biometrics information-user credential pairs, to determine the corresponding user credentials. Biometrics interface 406 may then relay the user credentials to the requesting container program.

Persistence manager 408 may include either a volume manager or a database on which bridge application 108 stores a user app list. When implemented as a volume manager, persistence manager 408 may mount a physical volume on UE 102 (e.g., via container platform 410 and operating system 412) to a particular mount point. When bridge application 108 obtains application information from map system 110, bridge application 108 may store the application information/user app list on the mounted storage.

Container platform 410 may provide an execution environment (e.g., Docker® runtime) for containerized applications, such as bridge application 108 and/or other containerized components (e.g., web kit 402, security module 404), etc.). Container platform 410 may comprise, for example, a client, a server (e.g., a daemon), a registry, and a repository, which may include a copy of bridge application 108. Biometrics drivers 412 may include drivers for driving components for obtaining biometrics information from UE 102 hardware or other software components (e.g., a software component for extracting a portion of an image captured by a UE camera; a hardware component for obtaining a fingerprint; etc.). Biometrics drivers 412 may be used by biometrics interface 406 to obtain biometrics information from the user of UE 102 and provide the information to biometrics interface 406. Operating system 414 may manage resources of UE 102 and provide an execution environment for various applications and/or services running on UE 102, such as container platform 410.

Modem 416 may include one or more components for communicating with access network 204, over one or more wireless links, and/or core network 206. Modem 416 may include, for example, a modulator-demodulator, a signal processor, a scheduler, etc., for implementing a radio communication protocol stack (3G, 4G, 5G, etc.) to support communication between the components of UE 102 and one or more devices of network environment 200.

For example, when bridge application 108 needs to establish a connection with map system 110, bridge application 108 may issue a request for connection, through container platform 410 and operating system 414, to modem 416. The request may include, for example, identifiers (IDs) that are associated with bridge application 108, such as an application ID, a traffic descriptor, an access point name, a data network name, etc. If modem 416 receives, in the request, a traffic descriptor, modem 416 may perform a look up of a URSP rule, in URSP database 418, which has the matching traffic descriptor. A traffic descriptor may indicate the type of traffic the application may send or receive, such as video traffic, audio traffic, and admin traffic. The rule with the matching descriptor may include a number of rules for selecting communication parameters (herein referred to as rule selection descriptors (RSDs)), such as an RSD for selecting, for example, a Protocol Data Unit (PDU) session type, an RSD for selecting a network slice, an RSD for selecting a data network name (DNN), etc. By using the RSDs, modem 416 may identify the network slice 212 with which bridge application 108 is to establish a communication session and then establish the session with the network slice (e.g., network slice 212 hosting map system 110).

URSP database 418 may receive URSP rules or URSP updates from the provider network and store the received URSP rules or URSP rule updates. In addition, when requested by modem 416, URSP database 418 may provide URSP rules with matching traffic descriptors. URSP database 418 may include or be implemented on, for example, an embedded Subscriber Identity module (eSIM), a Universal Integrated Circuit Card (UICC), an embedded UICC (eUICC), or another type of SIM-like device.

Figure 5:
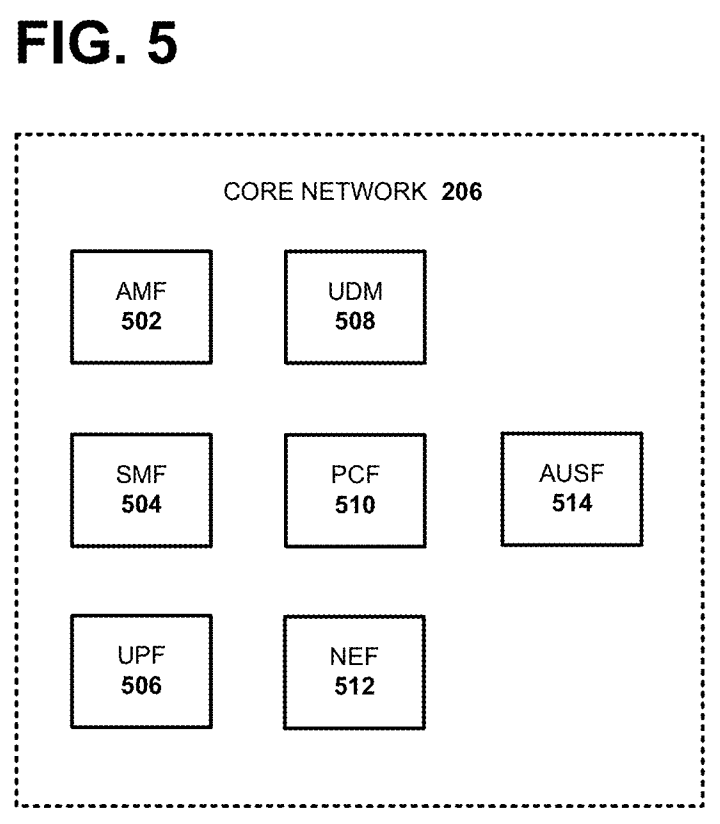

FIG. 5 shows exemplary components of core network 206, according to an implementation. As shown, core network 206 may comprise various network functions, including an Access and Mobility Management Function (AMF) 502, a Session Management Function (SMF) 504, a User Plane Function (UPF) 506, a Unified Data Management (UDM) 508, a Policy Control Function (PCF) 510, a Network Exposure Function (NEF) 512, and an Authentication Server Function (AUSF) 514. Depending on the implementation, each of functions 502-514 may be implemented as a standalone device, a virtual machine, or a containerized application via network function virtualization. Furthermore, depending on the implementation, core network 206 may include additional, fewer, or different network functions than those illustrated in FIG. 5.

AMF 502 may perform registration management, connection management, reachability management, mobility management, lawful intercepts, Short Message Service (SMS) transport between UE 102 and a SMS Function (SMSF), session management messages transport between UE 102 and SMF 504, access authentication and authorization, location services management, support non-3GPP access networks, and/or other types of management processes.

When requested by UE 102 to verify the authority of the user of UE 102 to access map system 110, AMF 502 may forward a request, which includes the user credentials, to UDM 508 to examine the subscription information for the user and to determine whether the user is authorized. When AMF 502 receives the result of the verification from UDM 508, AMF 502 may return the result to UE 102 via access network 204.

SMF 504 may perform session establishment, session modification, and/or session release, perform IP address allocation and management, perform Dynamic Host Configuration Protocol (DHCP) functions, perform selection and control of UPF 506, configure traffic steering at UPF 506 to guide the traffic to the correct destinations, terminate interfaces toward PCF 510, perform lawful intercepts, charge data collection, support charging interfaces, control and coordinate charging data collection, terminate session management parts of Non-Access Stratum (NAS) messages, perform downlink data notification, manage roaming functionality, and/or perform other types of control plane processes for managing user plane data.

When requested by AMF 502, SMF 504 may identify the UPF 506 that acts as a gateway to the network slice 212 on which map system 110 is hosted. SMF 504 may request the identified UPF 506 to serve as an anchor point for a PDU session with UE 102 and the network slice 212.

UPF 506 may maintain an anchor point for intra/inter-RAT mobility, maintain an external PDU point of interconnect to a particular data network (e.g., data network 208 or network slice 212), perform packet routing and forwarding, perform the user plane part of policy rule enforcement, perform packet inspection, perform lawful intercept, perform traffic usage reporting, perform Quality of Service (QOS) handling in the user plane, perform uplink traffic verification, perform transport level packet marking, perform downlink packet buffering, forward an "end marker" to a RAN node (e.g., gNB), and/or perform other types of user plane processes.

UDM 508 may maintain subscription information for UEs 102, manage subscriptions, generate authentication credentials, handle user identification, perform access authorization based on subscription data, perform network function registration management, maintain service and/or session continuity by maintaining assignment of SMF 504 for ongoing sessions, support SMS delivery, support lawful intercept functionality, and/or perform other processes associated with managing user data. PCF 510 may support policies to control network behavior, provide policy rules to control plane functions (e.g., to SMF 504), access subscription information relevant to policy decisions, perform policy decisions, and/or perform other types of processes associated with policy enforcement. Depending on the implementation, PCF 510 may distribute URSP rules to UEs 102. The URSP rules may include, for example, rules that permit UE 102 to identify and connect to the particular network slice on which map system 110 is running.

NEF 512 may expose capabilities and events to other NFs, including third party NFS, edge computing NFs, and/or other types of NFs. Furthermore, NEF 512 may secure provisioning of information from external applications to core network 206, translate information between core network 206 and devices/networks external to core network 206, support a Packet Flow Description (PFD) function, and/or perform other types of network exposure functions. In one implementation, NEF 512 may act as an interface between portal 116 and map system 110. Thus, NEF 512 would relay information to/from portal 116 from/to map system 110.

AUSF 514 may perform authentication. For example, AUSF 514 may implement an Extensible Authentication Protocol (EAP) authentication server and may store authentication keys for UE 102. In another example, AUSF 514 may perform an authentication to determine whether UE 102 Is authorized to access map system 110 or a particular set of application/content links that map system 110 stores in its database.

Figure 6:
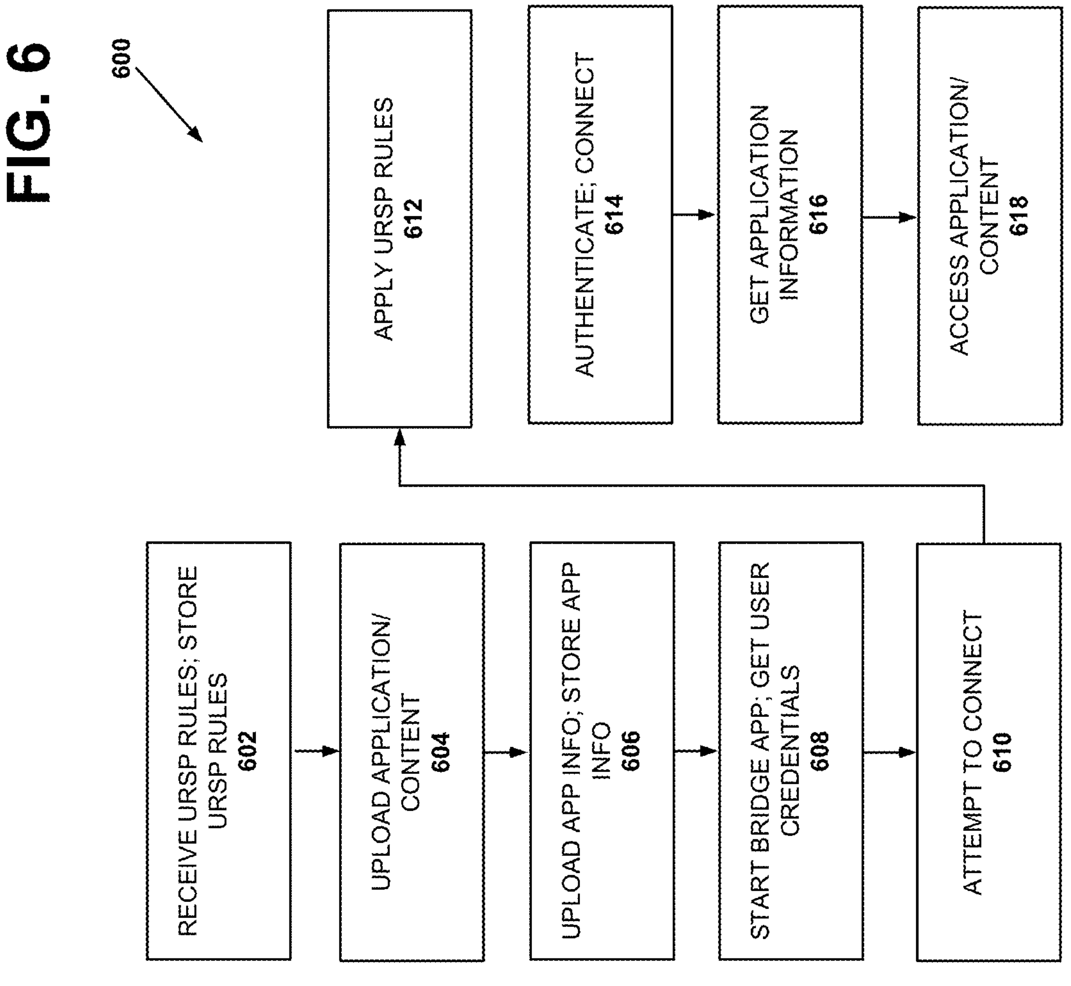
FIG. 6 is a flow diagram of an exemplary process that is associated with facilitating mobile device access to web applications, according to an implementation.
Figure 7:
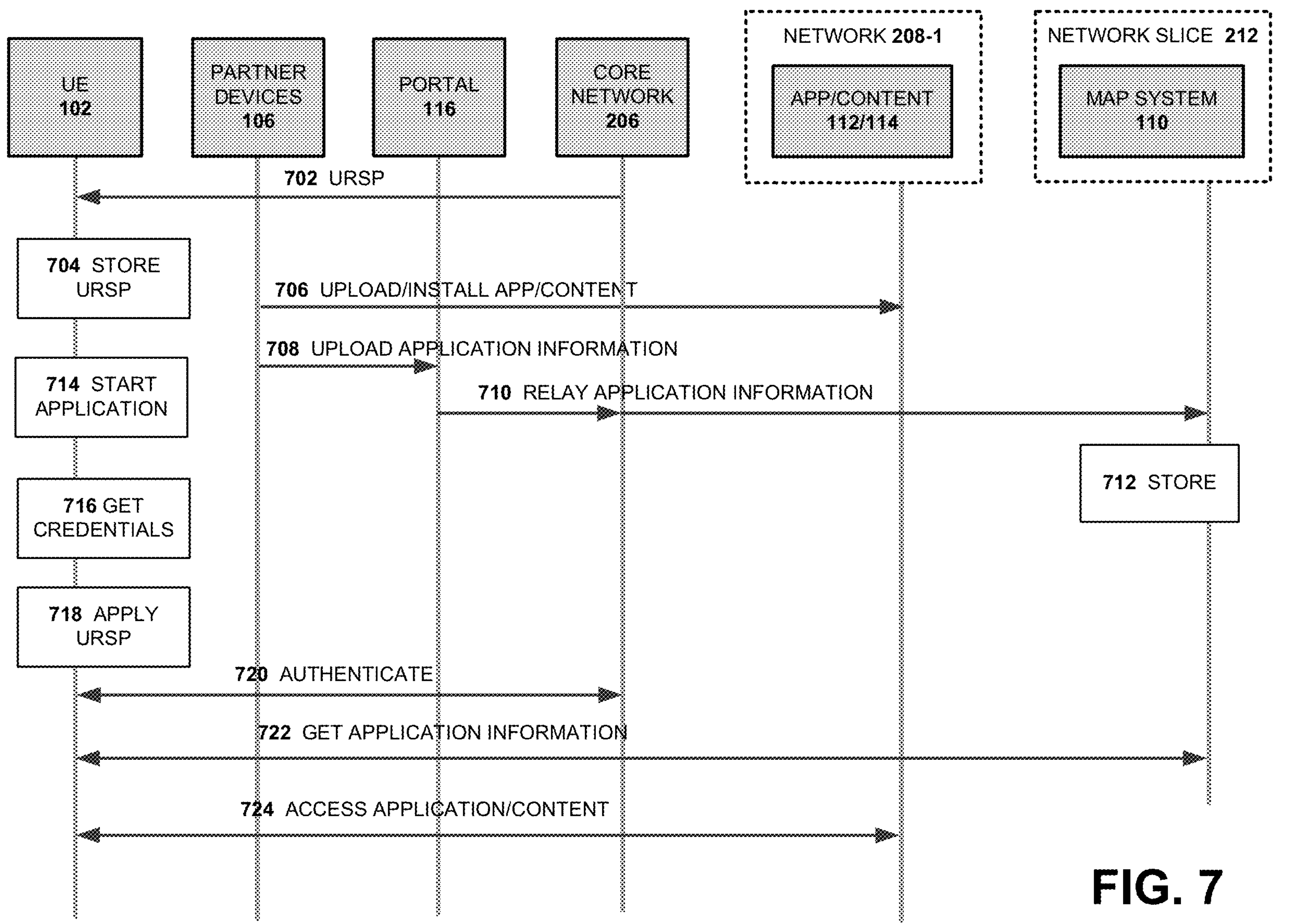
FIG. 7 illustrates exemplary messages that are exchanged by the system for facilitating mobile device access to web applications, according to an implementation.

FIG. 6 is a flow diagram of an exemplary process 600 that is associated with the system for facilitating mobile device access to web applications, according to an implementation. Process 600 may be performed by UE 102, partner device 106, map system 110, application 112, portal 116, and one or more components of core network 206 (e.g., NFs 502-514). These components may exchange one or more messages during process 600. FIG. 7 is a messaging diagram that illustrates the messages that the components may exchange during process 600. Below, FIG. 6 is described along with FIG. 7.

As shown in FIG. 6. Process 600 may include UE 102 receiving URSP rules from the provider network (block 602). For example, when PCF 510 determines that URSP rules need to be updated on UEs 102, PCF 510 may request a server (e.g., an Over-the-Air server) on the provider network to send updated URSP rules to an identified set of UEs 102. The URSP rules may specify, for example, a traffic descriptor associated with bridge application 108 and RSDs that identify the network slice on which the map system 110 is installed at the provider network. Upon receipt of the request from PCF 510, the server may schedule and forward the URSP rules to UE 102 over access network 204 (arrow 702 in FIG. 7). UE 102 may receive the URSP rules and store the rules in a storage (block 602; block 704 in FIG. 7). The storage may include, for example, one or more SIM-like devices.

Process 600 may further include uploading an application or content (block 604) and uploading and storing application information (block 606). For example, partner device 106 may upload application 112 or content 114 to data network 208-1 (arrow 706 in FIG. 7). In addition, partner device 106 may upload application information to map system 110. The application information may identify the network location (e.g., a network address, a URL, a URI, etc.) of the uploaded application 112 or content 114. When uploading the information, partner device 106 may send the information over multiple network components, such as portal 116 (arrow 708) and in data network 208-2 and core network 206 (e.g., NEF 512) (arrows 710), which may then forward the information to map system 110 (arrows 710). Map system 110 may then store the received application information (block 606; block 712).

Process 600 may further include launching or starting bridge application 108 (block 608; block 714). For example, the user of UE 102 may start or activate bridge application 108 installed on UE 102. When the user attempts to use bridge application (e.g., activate an icon corresponding to application 112 or content 114), bridge application 108 may obtain the user credentials (block 608; block 716). For example, bridge application 108 may cause biometrics interface 406 to call biometrics drivers 412 to obtain biometrics information (e.g., a fingerprint) of the user and then look up a previously stored set of biometrics information, where each biometrics information of the set is associated with user credentials. When biometrics interface 406 finds the biometrics information of the user in the set, biometrics interface 406 may obtain the corresponding user credentials and provide the user credentials to bridge application 108. Using the credentials, bridge application 108 may then attempt to connect to map system 110 (block 610), for example, via container platform 410 and operating system 414. Container platform 410 and operating system 414 may relay the connection request from bridge application 108 to modem 416. The request includes the user credentials and a traffic descriptor, which modem 416 may use in identifying a URSP rule for identifying the network slice 212 to which UE 102 is to establish a session.

Process 600 may further include applying a URSP rule (block 612; block 718). When modem 416 receives the request for connection from bridge application 108, modem 416 may look up URSP rules in URSP database 418. Upon finding a URSP rule with the matching traffic descriptor, modem 416 may apply the URSP rule to determine the network slice hosting map system 110.

Process 600 may further include authenticating the user (block 614; arrow 720), To establish the requested connection, modem 416 forwards an authentication request (which includes the user credentials) to core network 206. The authentication request may flow through AMF 502 to UDM 508, which then calls AUSF 514 to verify the user's authority to access map system 110. Assuming that the authentication is successful, modem 416 establishes the connection between bridge application 108 and map system 110 on network slice 212 (block 614). Furthermore, bridge application 108 may obtain the application information from map system 110 (block 616; arrow 722). Bridge application 108 may display the received application information as icons on the UE display screen.

Process 600 may further include accessing application 112 or content 114 (block 618; arrow 724). For example, when the user activates an icon that represents application 112 or content 114, bridge application 108 may function similarly as a browser and contact application 112 or access content 114 on data network 208-1. When accessing application 112 or content 114, if there is any JavaScript code, bridge application 108 may use web kit 402 to execute, when possible, the JavaScript code locally or natively at UE 102. Executing the JavaScript code may result in a callback to application 112. Bridge application 108 may store the application information in a local database through persistence manager 408. Later, when bridge application 108 restarts and is unable to access the provider network, bridge application 108 may retrieve the locally stored application information and display the information.

While a series of blocks and messages have been described above for process 600 in a particular order with reference to FIGS. 6 and 7, in other implementations, the order of the blocks and messages may be modified. In addition, non-dependent blocks may represent acts that can be performed in parallel; and non-dependent messages may be sent or received in parallel. FIGS. 6 and 7 are not intended to illustrate every act that the components of the system performs or every message that the components send. Furthermore, each message shown n FIG. 7 may include multiple messages between the components.

Figure 8:
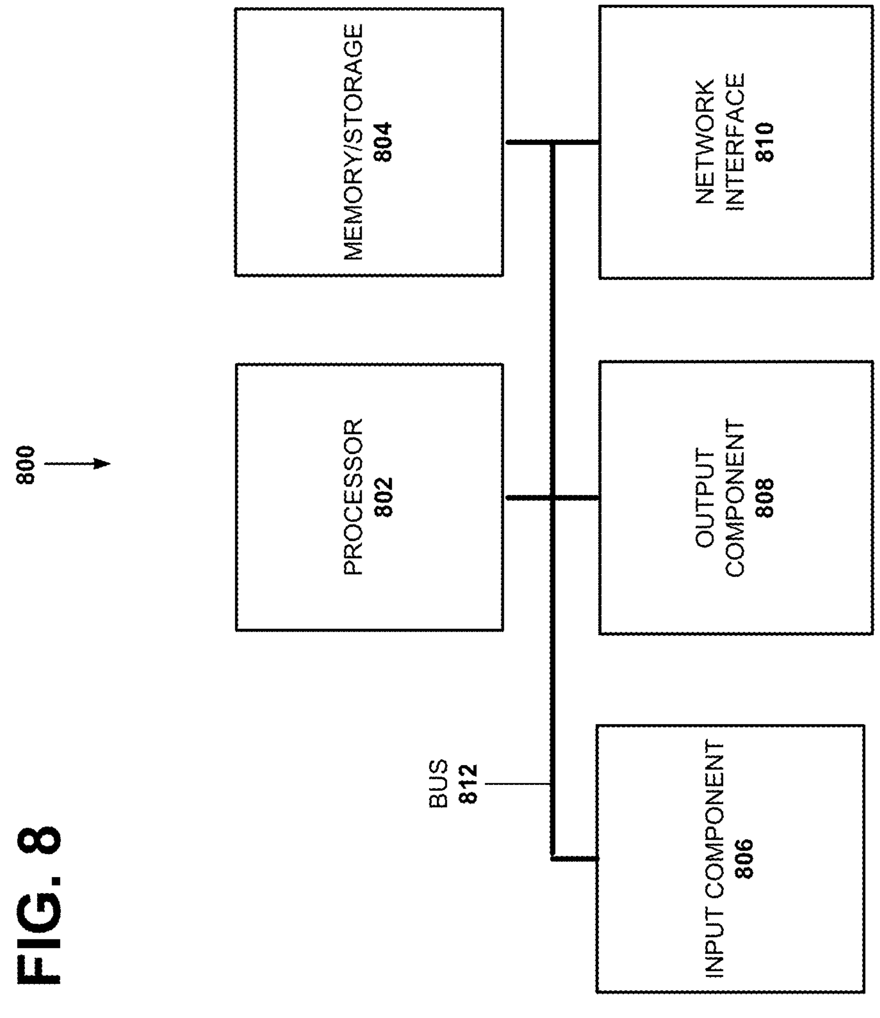
FIG. 8 depicts exemplary functional components of a network device according to an implementation.

FIG. 8 depicts example components of a network device 800. UE 102, partner device 106, access point device 202, access network 204, core network 206, data networks 208, access station 210, and/or other elements in network 104 (e.g., routers, bridges, gateways, servers, switches, etc.) may include or be implemented by or implemented on one or more of network device 800. As shown, network device 800 includes a processor 802, memory/storage 804, an input component 806, an output component 808, a network interface 810, and a communication path 812 (or bus 812). In different implementations, network device 800 may include additional, fewer, different, or a different arrangement of components than the ones illustrated in FIG. 8. For example, network device 800 may include a display, network card, etc.

Processor 802 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontrollers, and/or another processing logic device (e.g., embedded device) capable of controlling device 800 and/or executing programs/instructions.

Memory/storage 804 may include static memory, such as read only memory (ROM), and/or dynamic memory, such as random access memory (RAM), or onboard cache, for storing data and machine-readable instructions (e.g., programs, scripts, etc.). Memory/storage 804 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 804 may be external to and/or removable from network device 800. Memory/storage 804 may also include, for example, a Universal Serial Bus (USB) memory stick, a dongle, a hard disk, off-line storage, a Blu-Ray® disk (BD), etc.

Depending on the context, the term "memory," "storage," "storage device," "storage unit," "computer-readable medium," "non-transitory computer-readable medium," and/or "medium" may be used interchangeably. For example, a "computer-readable storage device" or "computer-readable medium" may refer to both a memory and/or storage device.

Input component 806 and output component 808 may provide input and output from/to a user to/from device 800. Input and output components 806 and 808 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 800.

Network interface 810 may include a transceiver (e.g., a transmitter and a receiver) for network device 800 to communicate with other devices and/or systems. For example, via network interface 810, network device 800 may communicate with wireless station 108. Network interface 810 may include an Ethernet interface to a LAN, and/or an interface/connection for connecting device 800 to other devices (e.g., a Bluetooth interface). For example, network interface 810 may include a wireless modem for modulation and demodulation.

Communication path 812 may enable components of network device 800 to communicate with one another.

Network device 800 may perform the operations described herein in response to processor 802 executing software instructions stored in a non-transitory computer-readable medium, such as memory/storage 804. The software instructions may be read into memory/storage 804 from another computer-readable medium or from another device via network interface 810. The software instructions stored in memory or storage (e.g., memory/storage 804, when executed by processor 802, may cause processor 802 to perform processes that are described herein. For example, instructions that are associated with implementing components depicted in FIGS. 1-7 may be executed by processor 802. When executed by processor 802, the instructions may cause processor 802 to perform functions and processes described above with reference to FIGS. 1-7.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A non-transitory computer-readable medium comprising computer-executable instructions, which, when executed by a processor on a User Equipment device (UE), cause the processor to:

instantiate a bridge application which includes a container application that runs on a container platform, wherein the container platform runs on an operating system on the UE and wherein the bridge application is configured to:

receive application information from a map system on a network slice included in a cellular network;

display the application information, which is received from the map system, as one or more icons that represent instances, of web applications, that are located on one or more networks different from the map system and the network slice; and when an icon is activated, access a web application among the web applications, wherein the web application corresponds to the icon, and wherein the map system is configured to:

receive the application information from a partner device through a portal for the cellular network;

store the received application information; and send the stored application information to the bridge application when the bridge application requests the application information.

2. The non-transitory computer-readable medium of claim 1, wherein the bridge application is further configured to:

access a web kit to execute JavaScript code on the UE; and perform a callback to the web application.

3. The non-transitory computer-readable medium of claim 1, wherein the bridge application is further configured to:

request, via an operating system running on the UE, the UE to connect to the map application on the network slice.

4. The non-transitory computer-readable medium of claim 3, wherein the request includes a traffic descriptor, and wherein the UE is configured to:

use the traffic descriptor to identify a UE Route Selection Policy (URSP) rule; and apply the URSP rule to identify the network slice.

5. The non-transitory computer-readable medium of claim 1, wherein the UE is further configured to:

receive a UE Route Selection Policy (URSP) rule for selecting the network slice from an over-the-air server on a provider network; and store the URSP rule in a URSP database.

6. The non-transitory computer-readable medium of claim 5, wherein the URSP database includes one of:

a Subscriber Identity Module (SIM), an embedded SIM, a Universal Integrated Circuit Card (UICC), or an embedded UICC.

7. The non-transitory computer-readable medium of claim 1, wherein when the map system receives the application information through the portal, the map system is configured to:

receive the application information through a Network Exposure Function (NEF) that relays the application information from the portal to the map system.

8. The non-transitory computer-readable medium of claim 1, wherein the bridge application is further configured to:

receive, from a user, biometrics information;

retrieve user credentials corresponding to the biometrics information; and use the user credentials to authenticate at a provider network that includes the network slice.

9. The non-transitory computer-readable medium of claim 1, wherein the application information includes: a list of Universal Resource Locators (URLs) corresponding to the web applications and icons corresponding to the web applications.

10. A method comprising:

instantiating, on a User Equipment device (UE), a bridge application which includes a container application that runs on a container platform, wherein the container platform runs on an operating system on the UE:

receiving, by the bridge application, application information from a map system on a network slice included in a cellular network;

displaying, by the bridge application, the application information, which is received from the map system, as one or more icons that represent instances, of web applications, that are located on one or more networks different from the map system and the network slice; and when an icon is activated, accessing, by the bridge application, a web application among the web applications, wherein the web application corresponds to the icon, and wherein the map system is configured to:

receive the application information from a partner device through a portal for the cellular network;

store the received application information; and send the stored application information to the bridge application when the bridge application requests the application information.

11. The method of claim 10, further comprising:

accessing, by the bridge application, a web kit to execute JavaScript code on the UE; and performing, by the bridge application, a callback to the web application.

12. The method of claim 10, further comprising:

requesting, by the bridge application, via an operating system running on the UE, the UE to connect to the map application on the network slice.

13. The method of claim 12, wherein the request includes a traffic descriptor, and wherein the UE is configured to:

use the traffic descriptor to identify a UE Route Selection Policy (URSP) rule; and apply the URSP rule to identify the network slice.

14. The method of claim 10, wherein the UE is further configured to:

receive a UE Route Selection Policy (URSP) rule for selecting the network slice from an over-the-air server on a provider network; and store the URSP rule in a URSP database.

15. The method of claim 14, wherein the URSP database includes one of:

a Subscriber Identity Module (SIM), an embedded SIM, a Universal Integrated Circuit Card (UICC), or an embedded UICC.

16. The method of claim 10, wherein when the map system receives the application information through the portal, the map system is configured to:

receive the application information through a Network Exposure Function (NEF) that relays the application information from the portal to the map system.

17. The method of claim 10, further comprising:

receiving, by the bridge application, from a user, biometrics information;

retrieving, by the bridge application, user credentials corresponding to the biometrics information; and using, by the bridge application, the user credentials to authenticate at a provider network that includes the network slice.

18. The method of claim 10, wherein the application information includes:

a list of Universal Resource Locators (URLs) corresponding to the web applications and icons corresponding to the web applications.

19. A system comprising:

a User Equipment device (UE) that includes a processor configured to:

instantiate a bridge application which includes a container application that runs on a container platform, wherein the container platform runs on an operating system on the UE and wherein the bridge application is configured to:

receive application information from a map system on a network slice included in a cellular network;

display the application information, which is received from the map system, as one or more icons that represent instances, of web applications, that are located on one or more networks different from the map system and the network slice; and when an icon is activated, access a web application among the web applications, wherein the web application corresponds to the icon, and wherein the map system is configured to:

receive the application information from a partner device through a portal for the cellular network;

store the received application information; and send the stored application information to the bridge application when the bridge application requests the application information.

20. The system of claim 19, wherein the bridge application is further configured to:

access a web kit to execute JavaScript code on the UE; and perform a callback to the web application.

* * * * *